(12) United States Patent
Bellefeuille et al.

(10) Patent No.: US 10,692,061 B2
(45) Date of Patent: Jun. 23, 2020

(54) SYSTEM AND METHOD FOR SWITCHING OF FINANCIAL ACCOUNTS BETWEEN FINANCIAL INSTITUTIONS

(75) Inventors: Dianne Bellefeuille, Farmington, MN (US); Tieg Herman, White Bear Lake, MN (US)

(73) Assignee: Deluxe Corporation, Shoreview, MN (US)

( * ) Notice: Subject to any disclaimer, the term of this patent is extended or adjusted under 35 U.S.C. 154(b) by 103 days.

(21) Appl. No.: 13/552,176

(22) Filed: Jul. 18, 2012

(65) Prior Publication Data

US 2013/0024367 A1   Jan. 24, 2013

Related U.S. Application Data

(60) Provisional application No. 61/509,085, filed on Jul. 18, 2011.

(51) Int. Cl.
*G06Q 20/00* (2012.01)
*G06Q 20/14* (2012.01)
*G06Q 30/04* (2012.01)

(52) U.S. Cl.
CPC ............. *G06Q 20/14* (2013.01); *G06Q 30/04* (2013.01)

(58) Field of Classification Search
CPC ...................................................... G06Q 20/14
USPC .......................................................... 705/40
See application file for complete search history.

(56) References Cited

U.S. PATENT DOCUMENTS

| | | | | |
|---|---|---|---|---|
| 6,721,716 B1* | 4/2004 | Gross | ...................... | G06Q 20/02 705/34 |
| 7,739,194 B2* | 6/2010 | Blinn et al. | ...................... | 705/41 |
| 8,126,921 B2* | 2/2012 | Wallach | ................ | G06Q 40/02 707/785 |
| 8,392,305 B2* | 3/2013 | Wehunt | .................. | G06Q 10/00 705/35 |
| 8,595,134 B2* | 11/2013 | Kelly | ...................... | G06Q 20/14 705/40 |
| 2003/0191711 A1* | 10/2003 | Jamison | ................. | G06Q 30/04 705/40 |
| 2003/0225688 A1* | 12/2003 | Dobbins | ................ | G06Q 20/10 705/39 |

(Continued)

FOREIGN PATENT DOCUMENTS

WO    WO-2013012920 A1    1/2013

OTHER PUBLICATIONS

Issuers use incentives to push paperless billing by Creditcards.com Jan. 10, 2011 (Year: 2011).*

(Continued)

*Primary Examiner* — Bruce I Ebersman
(74) *Attorney, Agent, or Firm* — Schwegman Lundberg & Woessner, P.A.

(57) ABSTRACT

A method may include receiving documentation that authorizes changing an automatic payment method of at least one biller account of a user from an old payment method to a new payment method; retrieving payment transaction details of the at least one biller account from the user; generating a switch schedule for the at least biller account based on the payment transaction details, the switch schedule including a date when the new payment method for the at least one biller account takes effect; and transmitting a notification to a biller of the at least one biller account, the notification requesting a transfer to the new payment method.

12 Claims, 4 Drawing Sheets

(56) References Cited

U.S. PATENT DOCUMENTS

2011/0071942 A1    3/2011  Wehunt et al.
2011/0251952 A1*  10/2011  Kelly et al. .................... 705/40

OTHER PUBLICATIONS

"U.S. Appl. No. PCT/US2012/047193, International Preliminary Report on Patentability dated Oct. 17, 2013", 12 pgs.
"U.S. Appl. No. PCT/US2012/047193, Response filed May 17, 2013 to Written Opinion dated Oct. 4, 2012", 6 pgs.
"U.S. Appl. No. PCT/US2012/047193, Search Report dated Oct. 4, 2012", 2 pgs.
"U.S. Appl. No. PCT/US2012/047193, Written Opinion dated Jun. 26, 2013", 4 pgs.
"U.S. Appl. No. PCT/US2012/047193, Written Opinion dated Oct. 4, 2012", 3 pgs.
"Notice from the European Patent Office dated Oct. 1, 2007 concerning business methods", Official Journal EPO, (Nov. 2007), 2 pgs.
"Canadian Application Serial No. 2,842,318, Office Action dated May 17, 2018", 7 pgs.
"Canadian Application Serial No. 2,842,318, Office Action dated Apr. 25, 2019", 7 pgs.
"Canadian Application Serial No. 2,842,318, Response filed Nov. 15, 2018 to Office Action dated May 17, 2018", w/ English Claims, 20 pgs.
"Canadian Application Serial No. 2,842,318, Response filed Oct. 23, 2019 to Office Action dated Apr. 25, 2019", 18 pgs.

* cited by examiner

SYSTEM AND METHOD FOR SWITCHING OF FINANCIAL ACCOUNTS BETWEEN FINANCIAL INSTITUTIONS

CROSS-REFERENCE TO RELATED PATENT DOCUMENTS

This patent application claims the benefit of priority, under 35 U.S.C. § 119(e), to U.S. Provisional Patent Application Ser. No. 61/509,085, titled SYSTEM AND METHOD FOR SWITCHING OF FINANCIAL ACCOUNTS BETWEEN FINANCIAL INSTITUTIONS," filed on Jul. 18, 2011, which is incorporated by reference in its entirety.

BACKGROUND

Many bank customers use automatic bill pay mechanisms to pay their bills each month. For example, a customer may pre-authorize drafting from a customer's bank account for each of the customer's utility bills each month. In other instances, customers may have their paychecks automatically deposited into their bank accounts each pay period.

BRIEF DESCRIPTION OF THE DRAWINGS

Some embodiments are illustrated by way of example and not limitation in the figures of the accompanying drawings in which.

DETAILED DESCRIPTION

The following detailed description includes references to the accompanying drawings, which form a part of the detailed description. The drawings show, by way of illustration, embodiments in which the invention may be practiced. Various embodiments may also be combined. The following detailed description is, therefore, not to be taken in a limiting sense, and the scope of the present invention is defined by the appended claims and their equivalents. In this document, the terms "a" or "an" are used, as is common in patent documents, to include one or more than one. In this document, the term "or" is used to refer to a nonexclusive or, unless otherwise indicated.

Switching financial institutions may present a number of challenges to a customer who has set up pre-authorized transactions and automatic deposits. For example, a customer may have pre-authorized payments set up for a number of biller accounts. For example, the customer may authorize the biller to draft the amount due for the bill each billing cycle from a bank account of the customer. In an example embodiment, the biller account represents the account the customer has with a biller. The biller is the entity which bills the customer each month. For example, a customer may have biller accounts for utilities, credit cards, insurance payments, and loans. Similarly, the customer may have a number of depositor accounts representing an account a customer has with a depositor. Depositors may include, for example, an employer of the customer. Thus, when a customer switches to a new bank all the set up work the customer has done must be redone for each biller and depositor accounts that have pre-authorized transactions. The time involved in such a switch may make it less likely the customer will switch to a new bank. Also, there is the problem that the customer may forget to change one or more biller accounts to the new bank and a payment may be missed. Therefore, a customer may wish to use a system which completes all the switching and notifies the customer when the switch is completed.

Figure 1:
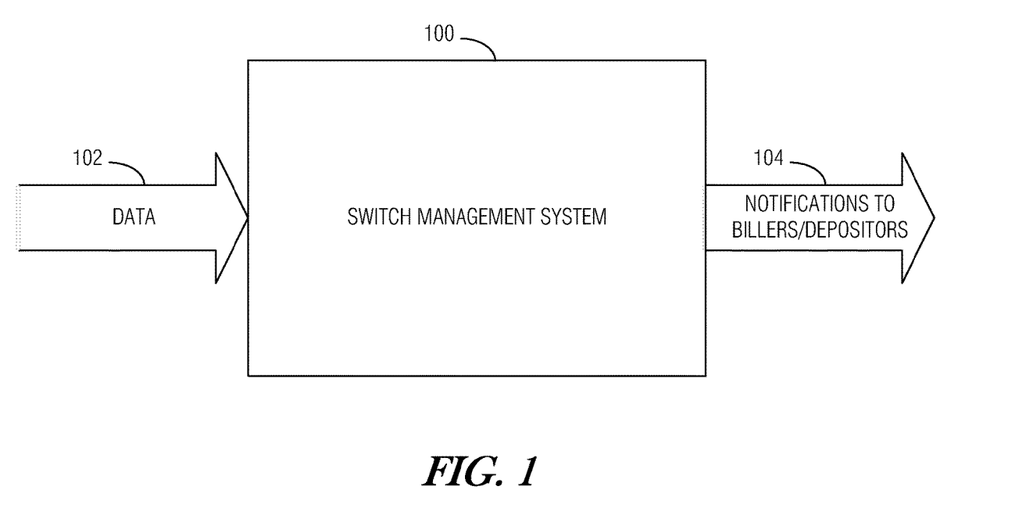
FIG. 1 is a block diagram of a system, according to an example embodiment.

FIG. 1 illustrates a network diagram illustrating an overview of example switch management system 100 that takes biller/depositor data input 102 and generates notifications 104 to biller/depositors to make a switch from an old account (e.g., checking account) to a new account of a customer (also referred to as a user). In various embodiments, biller/depositor account input data 102 is retrieved from the user. For example, input data 102 may be retrieved over a phone call or through electronic communications (e.g., website, e-mail). In an example embodiment, input data 102 includes data identifying each biller and depositor of the user as well as transaction details such as upcoming payment due dates and deposits, respectively. Switch management system 100 uses input data 102 to generate a switching schedule to switch each of the biller/depositors to the user's new account. Switch management system 100 further transmits (e.g., electronically, by facsimile, or by mail) notifications to each of the billers/depositors on the date indicated in the generated switch schedule. The notifications include an authorization to switch the payor accounts and depositee accounts from the old account to the new account. Lastly, system management system 100 transmits notifications to the user that the switch is completed.

Figure 2:
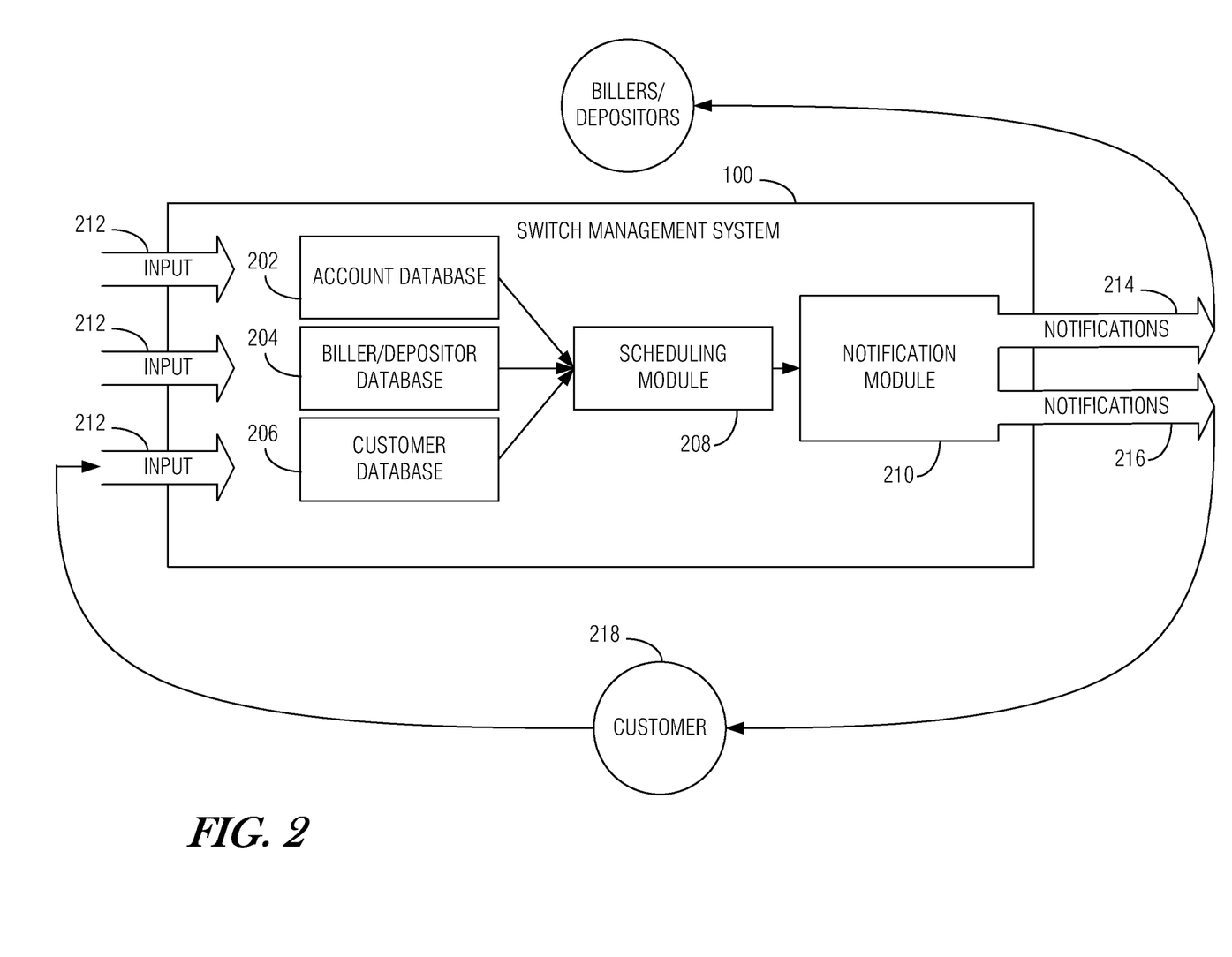
FIG. 2 is a block diagram of a switch management system, according to an example embodiment.

FIG. 2 illustrates a more detailed view of switch management system 100. Illustrated are account database 202, biller/depositor database 204, customer database 206, scheduling module 208, and notification module 210. Inputs 212 are also illustrated for populating account database 202, biller/depositor database 204, and customer database 206. Notification module generates notifications 214 and 216. Further illustrated is customer 218.

In various embodiments, data is inputted into account database 202, biller/depositor database 204, and customer database 206. Databases 202, 204, and 206 may be implemented in various forms such as flat files or relational databases. Account database 202 may store data representing financial institutions that have a relationship with switch management system 100. For example, a financial institution may offer the switching service of switch management system 100 to an existing or potential customer 218 when the customer opens an account (e.g., savings, checking, demand deposit account (DDA), etc.) with the financial institution. As part of this process, the financial institution presents an authorization form to the customer. The authorization form authorizes the switching agent (e.g., the administrator of switch management system 100) to switch the payor and depositee accounts of the biller and depositor accounts of the customer. Thus, in addition to storing basic details of each financial institution such as address, etc., account database 202 stores received signed authorization forms from the financial institutions.

In various embodiments, biller/depositor database 204 stores information of billers and depositors of customers of switch management system 200. The information may include the details necessary to implement a switch from an old payment method (an existing DDA account) to a new payment method (a new DDA account) or old depositee account (an existing DDA account) to a new depositee account (a new DDA account). For example, consider a utility company biller. The utility company may have a form that needs to be filled out in order to switch payment methods from an old bank account to a new bank account. The form or a link to the form may be stored in biller/depositor account database 204. Special requirements such as when a switch may be made (e.g., at least X number of days before a payment/deposit) may be stored in biller/depositor database 204.

Similarly, biller/depositor database 204 stores identifying information of the customer that may be required before a switch may be made. That is, a utility company may require a social security number or billing address of the customer before authorizing a new payment method. Other information stored in biller/depositor database 204 may include billing addresses and contact information of the biller or depositor.

In various embodiments, customer database 206 stores information on customers of switch management system 100. Customer information may include, but is not limited to, identifying information (e.g., name, address, social security numbers), financial account information (e.g., bank accounts, credit card accounts), and biller/depositor accounts of the customer. In various embodiments, customer information is retrieved during a conversation with the customer. In an example embodiment, the customer information is entered into a user interface provided by switch management system 100. Customer database 206 may also store an indication of whether or not a signed authorization form has been received for customer 218. In an example embodiment, customer database 208 also stores an indication of which financial account of the customer is going to be used for the switching process. In other words, which account of the customer will now be used for paying pre-authorized bills or receiving automatic deposits. In various embodiments, the customer may indicate a different financial account for different biller/depositor accounts. Biller/Depositor account information may include credentials in order to verify switch management system 100 to the biller/depositor.

In various embodiments, customer database 206 stores transaction details for the billers and depositor accounts of the customer. For example, a transaction detail for a utility biller account may include the pre-authorized payment due date for the biller account or pre-authorized deposit date for a depositor account. Transaction details may also include the balance of the biller account and past payments details. Biller/depositor account's data of the customer may also include account numbers of the customer for the billers and depositors.

In various embodiments, scheduling module 208 is responsible for at least two functions: (1) scheduling a call with the customer to retrieve biller/depositor account information; and (2) generating a switch schedule for switching the biller/depositor accounts of the customer.

With respect to scheduling the call, scheduling module may generate one or more dates in the future and relay the dates to a representative of switch management system to contact the customer. In an example embodiment, instead of scheduling a call, switch management system 100 may send an electronic communication (e.g., e-mail) to the customer instructing the customer to call a representative of switch management system 100 or to log-in to a website provided by switch management system 100.

In various embodiments, the switch schedule for the biller/depositor accounts is based on information stored in customer database 206 and biller/depositor database 204. For example, consider the utility company discussed above. Now, consider that the customer has indicated that a bill is due on the $15^{th}$ of each month and the utility company requires at least five days notice to change a payment method. If the current date is the $11^{th}$, the scheduling module will know that the payment method may not be switched until the following billing cycle. Thus, the switch schedule generated will indicate that the expected transfer of the pre-authorized bill will not occur until the following billing cycle. In an embodiment, the generated switch schedule will include the date when the new payment method/new depositee account will take effect for the biller or depositor.

In various embodiments, notification module 210 is responsible generating notifications 214 to the billers/depositors and notifications 216 to customer 218.

In an example embodiment, notifications 214 are sent to the biller/depositor on the switch data according to the switch schedule and contact information stored in biller/depositor database 104. Notifications 214 may be generated in accordance with the requirements and form of the biller/depositor as stored in biller/depositor database 204. In an example embodiment, the required information may be retrieved from customer database 206. The final form of a notification may be a completed switch form provided by the biller/depositor.

Thus, notification module 210 may transit (e.g., by mail, electronically, or telephonically according to the contact information) the completed form on the calculated notification date. In an example embodiment, the notification may not be sent only to the biller/depositor but also the previous payor/depositee account of the customer.

During the switching process, notification module 210 may transmit notifications (e.g., through e-mail, by phone, or by mail) 216 to customer 218. In an example embodiment, notifications 218 include information that informs the customer that a switch for a biller/depositor is completed. In various embodiments, notifications 216 inform the customer of the switching schedule. In yet another example embodiment, notifications 216 inform the customer that a switch has failed and that more information is needed from the customer to complete the switch.

Figure 3:
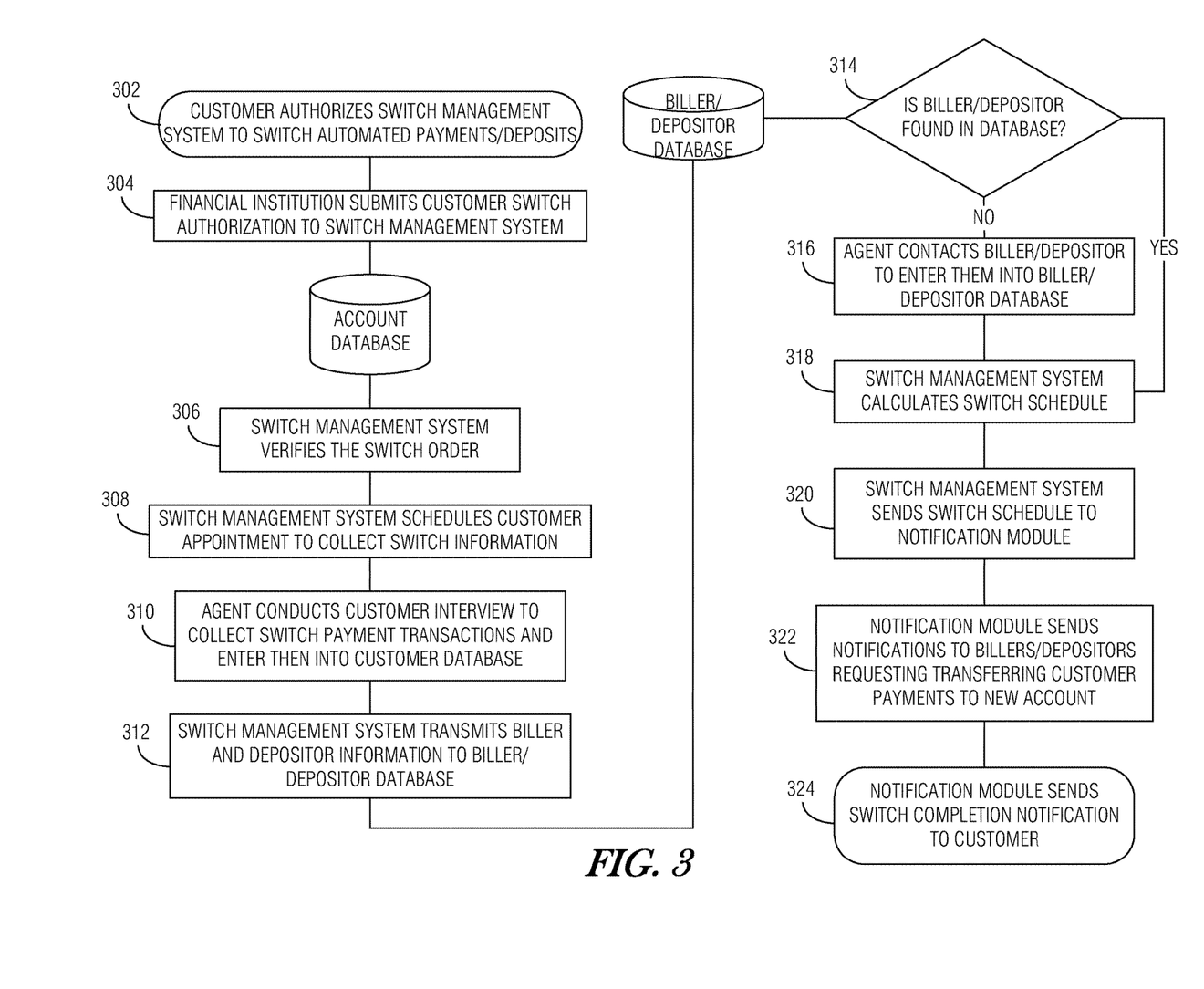
FIG. 3 is a flowchart diagram, according to an example embodiment.

FIG. 3 is a flowchart illustrating a method of using switch management system. At block 302, a customer authorizes switch management service to switch pre-authorized payments and deposits of the customer. In an embodiment, this includes filling out documentation that authorizes the switch management system to change an automatic payment method of a least one biller or depositor account of the customer. This may include the customer signing an authorization form authorizing the switch management system to access biller and depositor accounts of the customer. The customer may fill out the documentation at a financial institution in which the customer is opening an account.

In an embodiment, at block 304 financial institution submits the customer switching authorization (e.g., the documentation) to the switch management system where it is received and stored in an account database. In an embodiment, at block 306, the switch management service verifies that the documentation is sufficient to authorize changing to a new payment method. For example, this may include sending the authorization form to a representative of the switch management service for review. Upon review (e.g., checking for a valid signature) the representative may transmit (e.g., via e-mail, phone, web) that the documentation is or is not sufficient.

In an embodiment, at block 308 the switch management system schedules a customer appointment to collect switch information from the customer. At block 310, an agent of the switch management system conducts a customer interview to collect the switch payment transactions and enter them into a customer database. Information retrieved during the call may include which biller and depositor accounts the customer wishes to switch to the new account opened at the financial institution.

In various embodiments, instead of, or in addition to collecting biller and depositor accounts from the customer during the call, information may be retrieved which allows the switch management system to look at payment and deposit transaction histories of the customer to determine the billers and depositors of the customer automatically. Therefore, the customer may be reassured that all automatic payments will be transferred to the new account.

In an embodiment, at block 312 the switch management system transmits the biller and depositor information retrieved during the call to a biller/depositor database. At decision block 314, the switch management system queries the biller and depositor database to determine if the biller or depositor is present in the biller and depositor database. If not, at block 316 an agent of the switch management system may contact the biller and depositor to retrieve details of the biller or depositor for use in switching the customer's account.

In an embodiment, at block 318 the switch management system calculates and generates a switch schedule for the customer. The generated switch schedule includes dates to expect transactions to arrive/be billed in the new account. The calculated schedule may be based on information stored in the biller/depositor database and customer database. For example, the customer will have told a representative when pre-authorized transactions occur for the biller/depositor accounts of the customer. Thus, in various embodiments based on the current date and requirements of the biller/depositor, a switch schedule is generated that includes the dates when each of the biller/depositors accounts will be transferred to the new financial account (DDA account) of the customer. At block 320, the switch management system sends the switch schedule to a notification module.

In an embodiment, at block 322 a notification module of the switch management system sends notifications to billers/depositors requesting transferring of the customers payments/deposits to the new account. The notification may be generated in accordance with requirements of the individual biller/depositor is stored in the biller/depositor database and information stored in the customer database.

In an embodiment, at block 324 the notification module sends a switch complete notification to the customer. This may be done after each the notifications have been sent to the billers/depositors. In various embodiments, additional status notifications are sent to the customer during the switching process.

While the above figures and methods have been described with specific names to different modules, other names may be used. Similarly, one module may perform the functionality of a different module. Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

A Computer System

Figure 4:
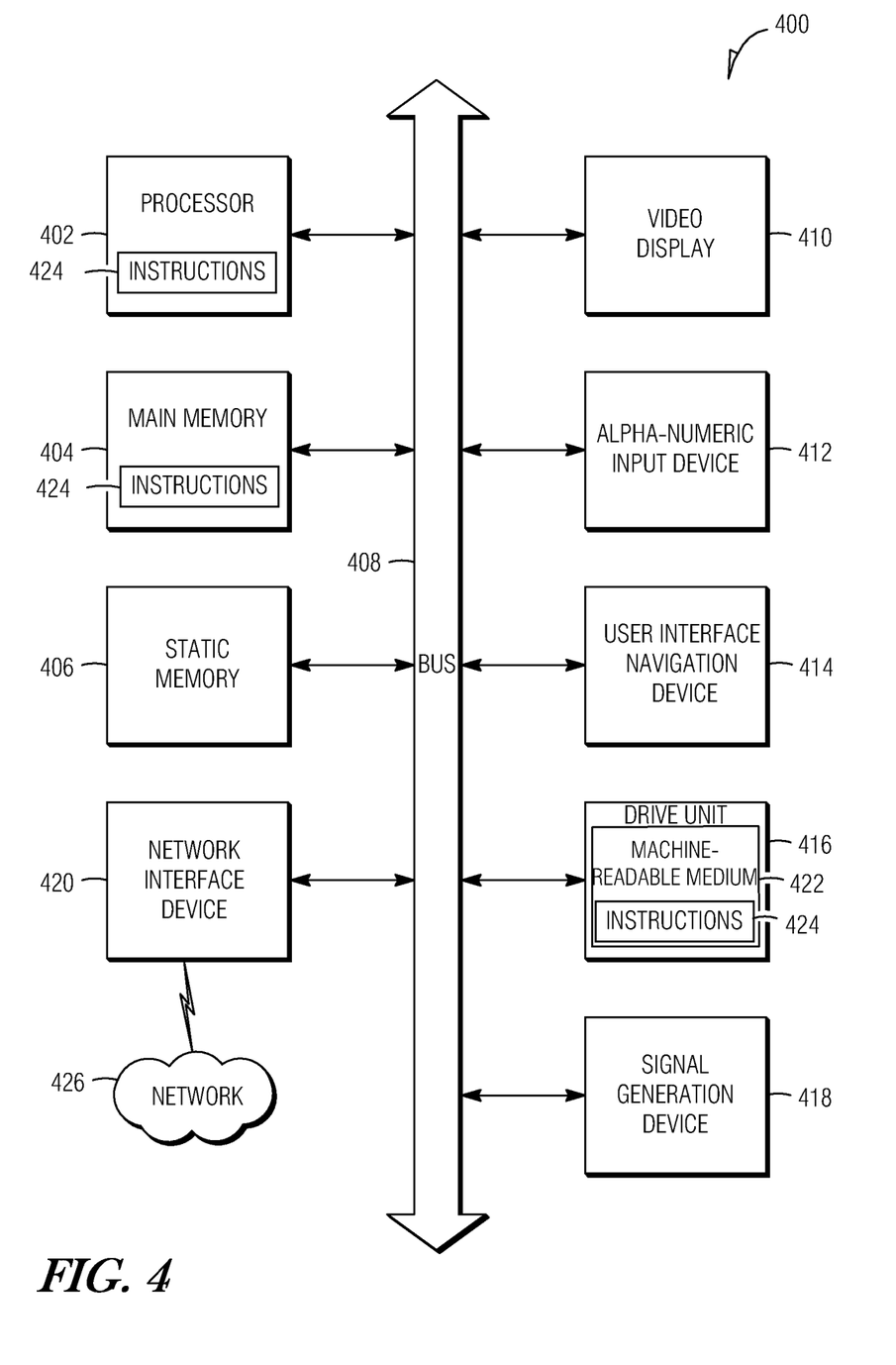
FIG. 4 illustrates a computer system, according to an example embodiment.

FIG. 4 shows a diagrammatic representation of a machine in the example form of a computer system 400 within which a set of instructions for causing the machine to perform any one or more of the methods, processes, operations, or methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems which that are linked (e.g., either by hardwired, wireless, or a combination of hardwired and wireless connections) through a network, both perform tasks. In a distributed system environment, program modules may be located in both local and remote memory-storage devices (see below).

The example computer system 400 includes a processor 402 (e.g., a Central Processing Unit (CPU), a Graphics Processing Unit (GPU) or both), a main memory 401 and a static memory 406, which communicate with each other via a bus 408. The computer system 400 may further include a video display unit 410 (e.g., a Liquid Crystal Display (LCD) or a Cathode Ray Tube (CRT)). The computer system 400 also includes an alphanumeric input device 412 (e.g., a keyboard), a User Interface (UI) cursor controller 414 (e.g., a mouse), a disk drive unit 416, a signal generation device 418 (e.g., a speaker) and a network interface device 420 (e.g., a transmitter).

The disk drive unit 416 includes a machine-readable medium 422 (e.g., computer-readable storage device) on which is stored one or more sets of instructions 424 and data structures (e.g., software) embodying or used by any one or more of the methodologies or functions illustrated herein. The software may also reside, completely or at least partially, within the main memory 401 and/or within the processor 402 during execution thereof by the computer system 400, the main memory 401 and the processor 402 also constituting machine-readable media.

The instructions 424 may further be transmitted or received over a network 426 via the network interface device 420 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic medium.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

It is to be understood that the above description is intended to be illustrative, and not restrictive. For example, the above-illustrated embodiments (and/or aspects thereof) may be used in combination with each other. Many other embodiments may be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A method comprising:
   receiving, at a switch management system, documentation in an electronic communication that authorizes changing an automatic payment method of at least one biller account of a user from an old payment method to a new payment method, wherein the old payment method is a first bank account and the new payment method is a second bank account and wherein receiving the documentation that authorizes changing the automatic payment method includes receiving the documentation from a second bank corresponding to the second bank account;
   verifying, using at least one processor of the switch management system, that the documentation authorizes changing to the new payment method by accessing a customer database;
   querying the customer database for a signed authorization form;
   determining that an indication of the signed authorization form is stored in the customer database, wherein the customer database includes at least one relational entry of the new payment method corresponding to the at least one biller account for the user, the at least one relational entry including verification credentials for the new payment method;
   automatically querying, using the switch management system, the biller database to determine if a biller of the at least one biller account exists;
   electronically contacting the biller when it is determined that the biller does not exist in the database to retrieve requirements for switching a payment method;
   creating an entry in the biller database for the biller with the retrieved requirements;
   retrieving, from a biller database, transaction details of the at least one biller account of the user;
   retrieving, from the customer database, a customer-specified date to change to the new payment method;
   generating, using the at least one processor of the switch management system, a switch schedule for the at least one biller account based on the transaction details and the customer-specified date retrieved from the customer database, the switch schedule including a date when the new payment method for the at least one biller account takes effect, wherein the date is after the customer-specified date and in a subsequent billing cycle, and wherein the old payment method is to be used for at least one more billing cycle before the subsequent billing cycle; and
   electronically transmitting a notification to the biller at a biller server of the at least one biller account according to the switch schedule, the notification requesting a transfer to the new payment method effective at the date when the new payment method for the at least one biller account takes effect, wherein the notification is generated in accordance with at least one requirement or form of the biller.

2. The method of claim 1, wherein the documentation includes an authorization form signed by the user.

3. The method of claim 1, further comprising verifying the documentation is sufficient to authorize changing to the new payment method.

4. The method of claim 1, wherein the at least one biller account includes a utility account.

5. The method of claim 1, wherein the customer database is a relational database and the biller database is a flat file database.

6. A system comprising:
   an account database configured to store documentation, received via an electronic communication, that authorizes changing a depositee account of a depositor account of a user from an old depositee account to a new depositee account, wherein the old depositee account is a first bank account and the new depositee account is a second bank account and wherein the documentation that authorizes changing the depositee account is received via the electronic communication from a second bank corresponding to the second bank account; and a hardware processor configured to:

verify that the documentation authorizes changing to the new depositee account by accessing a customer database;

querying the customer data base for a signed authorization form;

determining that an indication of the signed authorization form is stored in the customer database, wherein the customer database includes at least one relational entry of the new depositee account corresponding to the depositor account for the user, the at least one relational entry including verification credentials for the new payment method;

automatically query the account database to determine if a depositor of the depositor account exists;

electronically contact the depositor when it is determined that the depositor does not exist in the database to retrieve requirements for switching a payment method;

create an entry in the account database for the depositor with the retrieved requirements;

retrieve, from the customer database, a customer-specified date to change to the new depositee account;

generate a switch schedule for the at least one depositor account based on transaction detail of the depositor account and the customer-specified date retrieved from the customer database, the switch schedule including a date when the new depositee account is to be used for the depositor account, wherein the date when the new depositee account is to be used is after the customer-specified data and in a subsequent billing deposit cycle, and wherein the old depositee account is to be used for at least one more deposit cycle before the subsequent deposit cycle; and electronically transmit a notification to the depositor at a depositor server of the depositor account according to the switch schedule, the notification requesting a transfer to the new depositee account in the subsequent billing deposit cycle, wherein the notification is generated in accordance with at least one requirement or form of the depositor.

7. The system of claim 6, wherein the documentation includes an authorization form signed by the user.

8. The system of claim 6, further comprising a database of depositors, the database of depositors storing the transaction detail of the depositor account.

9. The system of claim 6, wherein the depositor account includes an employer account associated with the user.

10. A non-transitory computer-readable storage device comprising instructions which when executed by at least one processor of a switch management system, cause the at least one processor to:

receive, at the switch management system, documentation in an electronic communication that authorizes changing an automatic payment method of at least one biller account of a user from an old payment method to a new payment method, wherein the old payment method is a first bank account and the new payment method is a second bank account and wherein receiving the documentation that authorizes changing the automatic payment method includes receiving the documentation from a second bank corresponding to the second bank account;

verify, at the switch management system, that the documentation authorizes changing to the new payment method by accessing a customer database;

querying the customer database for a signed authorization form;

determining that an indication of a signed authorization form is stored in the customer database, wherein the customer database includes at least one relational entry of the new payment method corresponding to the at least one biller account for the user, the at least one relational entry including verification credentials for the new payment method;

automatically query, using the switch management system, the biller database to determine if a biller of the at least one biller account exists;

electronically contact the biller when it is determined that the biller does not exist in the database to retrieve requirements for switching a payment method;

create an entry in the biller database for the biller with the retrieved requirements;

retrieve, from a biller database, transaction details of the at least one biller account from the user;

generate, at the switch management system, a switch schedule for the at least one biller account based on the transaction details and the customer-specified date retrieved from the customer database, the switch schedule including a date when the new payment method for the at least one biller account takes effect, wherein the date is after the customer-specified date and in a subsequent billing cycle, and wherein the old payment method is to be used for at least one more billing cycle before the subsequent billing cycle; and electronically transmit a notification to the biller at a biller server of the at least one biller account according to the switch schedule, the notification requesting a transfer to the new payment method effective at the date when the new payment method for the at least one biller account takes effect, wherein the notification is generated in accordance with at least one requirement or form of the biller.

11. The non-transitory computer-readable storage device of claim 10, wherein the documentation includes an authorization form signed by the user.

12. The non-transitory computer-readable storage device of claim 10, wherein the at least one biller account includes a utility account.

* * * * *